C. R. DOWNS.
SULFONATION OF HYDROCARBONS.
APPLICATION FILED MAY 13, 1918.
Patented Apr. 22, 1919.
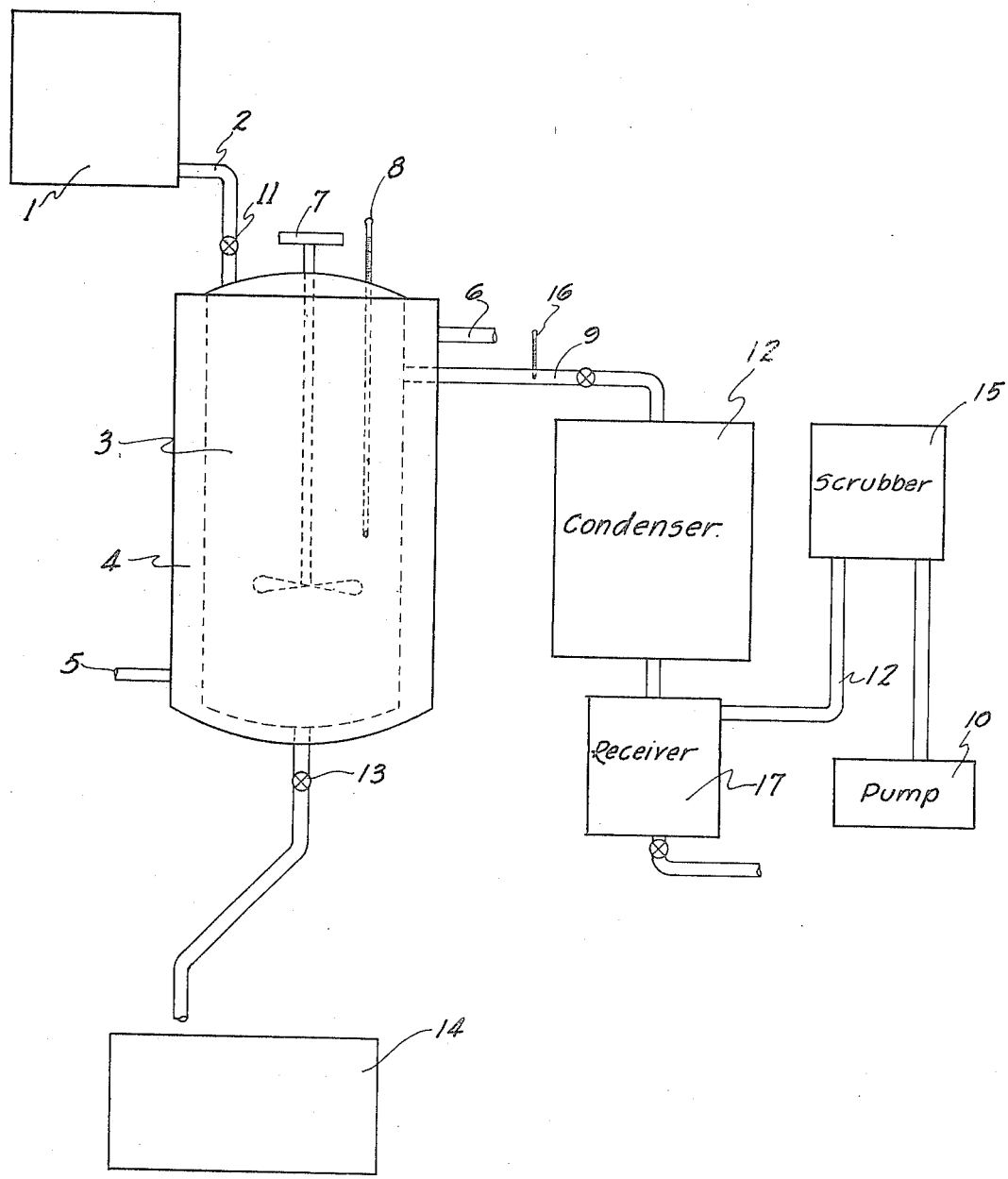
INVENTOR
Charles R. Downs
BY
Chas. W. Mortimer
ATTORNEY

@# UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

SULFONATION OF HYDROCARBONS.

1,301,785.

Specification of Letters Patent.

Patented Apr. 22, 1919.

Application filed May 13, 1918. Serial No. 234,203.

*To all whom it may concern:*

Be it known that I, CHARLES R. DOWNS, a citizen of the United States, residing at Cliffside, in the county of Bergen and State of New Jersey, have invented certain new and useful Improvements in Sulfonation of Hydrocarbons, of which the following is a specification.

This invention relates to improvements in the sulfonation of hydrocarbons and hydrocarbon derivatives, and in the production of sulfonated products in a form relatively free from the excess sulfuric acid utilized in their production.

In the sulfonation of hydrocarbons and hyrdocarbon derivatives and the production of sulfonated derivatives therefrom, an excess of sulfuric acid is commonly employed. As the sulfonation proceeds, the amount of sulfuric acid which remains for effecting the further sulfonation progressively decreases. The progress of the sulfonation is also accompanied by the setting free of water which, unless removed, accumulates and retards the further sulfonation. In order that the sulfonation may be carried to approximate completion, it is accordingly customary to utilize a considerable excess of sulfuric acid, and particularly where the water formed is not removed during the progress of the sulfonation.

At the end of the sulfonation reaction, or when the sulfonation reaction has progressed to the desired extent, there will accordingly be present a considerable excess of sulfuric acid, either with or without the water formed during the reaction, and the water originally present in the sulfuric acid employed.

In order to remove such excess of sulfuric acid and obtain the sulfonated product relatively free therefrom, it has been customary to add a neutralizing agent, for example, lime or calcium carbonate, to convert the sulfuric acid into calcium sulfate or gypsum which can be readily removed. Such neutralization, however, not only involves the addition of a neutralizing agent, but it involves also the loss of the excess sulfuric acid.

I have now found that the sulfonation process can be carried out in an improved and advantageous manner, and with the recovery of the excess sulfuric acid employed, by a distillation of the sulfuric acid from the product of the sulfonation under a sufficiently high vacuum and, moreover, at a temperature which is below that injurious to the product of sulfonation.

It is accordingly one of the objects of the invention to produce sulfonated products, which shall contain only a small amount, if any, of water or sulfuric acid.

Other objects of the invention are the production of benzene disulfonic acid which will be comparatively free from mono-sulfonic acid, and which is suitable for fusion with alkalis without first requiring to be neutralized with lime or subjected to similar treatment for the removal of sulfuric acid.

It is a further object of the invention to recover the excess sulfuric acid from the product of sulfonation in the form of concentrated acid available for further use where an acid of high concentration is desired.

Other objects and advantages of the invention will be indicated as the description proceeds.

The process of the present invention may be practised with the sulfonation products produced by different processes of sulfonation in which an excess of sulfuric acid is employed. It may also, with advantage, be combined with the sulfonation process itself, as a part thereof.

The process of the invention is applicable to the production of different sulfonated hydrocarbons and hydrocarbon derivatives; but I have found it of especial advantage in connection with the production of benzene disulfonic acid, and the invention will be more particularly described in connection therewith.

In the production of benzene disulfonic acid, a large excess of sulfuric acid is commonly employed so that the disulfonic acid will contain but little mono-sulfonic acid, and so that the sulfonation will be completed without undue prolongation of the sulfonation process. As a result, a large amount of sulfuric acid is present at the end of the sulfonation. If the water formed during the sulfonation is not removed, this water will also be present at the end of the sulfonation, together with any water added with the sulfuric acid employed. The presence of this water, where it is not removed during the sulfonation, makes necessary the utilization of even larger amounts of acid than when the water is removed during the sulfonation, so that, where the water is present at the end of the sulfonation, a larger excess of sulfuric acid will usually also be present. When the water has been removed during the sulfonation, the excess of sulfuric acid need not be so great, but a considerable excess will nevertheless usually be present.

In carrying out the process of the invention in producing benzene di-sulfonic acid, the product of the sulfonation, containing the excess sulfuric acid, or the excess sulfuric acid and water, may be introduced into a still where it is subjected to a temperature of approximately 260° C. and a vacuum corresponding to an absolute pressure of about 1 inch of mercury. With benzene disulfonic acid it is impracticable to raise the temperature to around 280° C. or higher since decomposition or carbonization of the sulfonic acid takes place to an objectionable extent at such temperatures. In order to avoid such objectionable decomposition, it will generally be advisable to maintain the temperature at about 260° C. and to regard this temperature as about the upper limit to be maintained during the process.

Where the sulfonation product treated has been previously freed from water, the sulfuric acid can be directly obtained in a concentrated state by the vacuum distillation above described. Where the sulfonation product contains both water and sulfuric acid, the distillation may be carried out gradually or progressively so that the water will be first removed without the removal of much of the sulfuric acid, and so that the sulfuric acid will be subsequently recovered in a more concentrated state and relatively free from the excess of water present in the sulfonation product.

It will be evident that sulfonation products produced by various methods of sulfonation may be subjected to the improved process of the present invention for the separation of the excess sulfuric acid, or of the excess sulfuric acid and water therefrom, and for the recovery of the sulfuric acid in a concentrated form available for further use.

Since the sulfonic acids are generally non-volatile, at any temperature below that at which decomposition begins, the sulfonic acids will not be volatilized or objectionably decomposed if the temperature is maintained below that of decomposition. Nevertheless, all of the water and most of the sulfuric acid may be distilled off from the sulfonation product, by the employment of a sufficient degree of vacuum, at a temperature below that of objectionable decomposition of the sulfonic acids. Thus, in the case of benzene disulfonic acid, the water and most of the sulfuric acid may be distilled off at a temperature not materially exceeding 260° C. and without objectionable decomposition of the disulfonic acid.

While different degrees of vacuum may be used with advantage, I have found that very satisfactory results can be obtained, and that the process can be carried out in a practical way, by using a vacuum corresponding to an absolute pressure ranging from about $\frac{1}{2}$ inch to 1 inch of mercury, but the process is not strictly confined to these limits. The vacuum applied should, of course, be sufficiently great to reduce the boiling point of the sulfuric acid to a temperature which is below that of decomposition of the sulfonic acid or acids. I have found that concentrated sulfuric acid can be readily distilled off from a mixture of sulfonated benzene and sulfuric acid at a temperature of the mixture which does not rise above 260° C., when a proper vacuum is used. In fact, when the still is maintained at or closely below this temperature, and where the water present has been previously removed, or is removed during the early stages of the distillation, it is possible to recover sulfuric acid of approximately 98% concentration by carrying out the distillation under an absolute pressure of from $\frac{1}{2}$ to 1 inch of mercury, the vapor temperature of the acid being from approximately 205° C. to 215° C.

When water is present in the sulfonation product, this water may be first removed, and under a lower degree of vacuum than that required for the removal of the other products. When the water is thus removed, the sulfuric acid remaining becomes more concentrated. Any benzene mono-sulfonic acid present in the sulfonation product will be subjected to the action of the more concentrated acid thus produced and will be to a greater or less extent converted into the disulfonic acid. Accordingly, the process of the present invention, when applied to a product of sulfonation previously produced, may be considered as a process of effecting further sulfonation by the concentrated acid which is formed and which is being removed during the distillation, so that the product from which the sulfuric acid has been for the most part removed will contain more benzene disulfonic acid and less mono-sulfonic acid than the sulfonation product prior to such distillation.

In the case of benzene disulfonic acid and its accompanying excess sulfuric acid, the distillation can be continued until less than 5% by weight of sulfuric acid remains mixed with the sulfonic acid. After the content of sulfuric acid has been reduced to this extent, the mixture of sulfonic acid and residual sulfuric acid can be directly neutralized, if desired, with a strong solution of soda ash, or sodium sulfite, or sodium hydroxid, etc., to produce a salt which is suitable for caustic fusion, thus avoiding the necessity of first treating the mixture with lime.

The benzene disulfonic acid which is obtained according to the present invention, is in a substantially anhydrous state, and contains but small amounts of monosulfonic acid. The product can be neutralized, as above stated, so as to obtain a solution which, without evaporation, is in proper condition to be introduced into a fusion pot.

The process of the present invention can, with added advantage be practised as a part of the sulfonation process itself, and particularly where the sulfonation process is carried out under a sufficient vacuum to remove the water formed during the progress of the sulfonation, as described in my prior Patents Nos. 1,279,295 and 1,279,296.

At the end of the usual sulfonation process for the production of benzene disulfonic acid, the sulfonation product will usually be at a temperture of around 260° C. and such sulfonation product, while still retaining the heat imparted to it during the sulfonation, may be directly subjected to the high vacuum above referred to, while this temperature is maintained, so that the removal of the sulfuric acid, and water, if present, will immediately follow the sulfonation, without requiring any supplemental heating of the product other than that required for the maintenance of its temperature during the vacuum distillation and removal of the sulfuric acid.

If the sulfonation process has been carried out with removal of the water formed during the progress thereof, the excess sulfuric acid can be removed simply by the application of the necessary vacuum and by the maintenance of the temperature required for the distillation.

Where the sulfonation process is practised in accordance with the method described in my aforesaid applications by the employment of a sufficient vacuum to remove the water formed by the sulfonation reaction, the product of the sulfonation will be relatively free from water and already heated to the temperature required for the distillation of the remaining sulfuric acid. It will also be under a vacuum, though insufficient for the distillation of the sulfuric acid, and it will simply be necessary to increase the vacuum to the amount required for the distillation of the sulfuric acid in order to complete the process.

Accordingly, I regard such process, which is practised with the maintenance of a vacuum during the sulfonation, for the removal of water, so that it is necessary merely to increase the vacuum at the end of the sulfonation, and while the temperature is still maintained at that of sulfonation, as a particularly valuable embodiment of the invention.

The apparatus employed, moreover, for the practice of the present invention, may be the same as that employed for the practice of the inventions of said prior applications, provided the vacuum-producing means is sufficient to give the desired high degree of vacuum required for the sulfuric acid distillation.

An apparatus for carrying out the process of the present invention is illustrated diagrammatically in the accompanying drawing, in which 1 represents a tank from which the product of the sulfonation, containing the sulfonic acid, sulfuric acid and water, is introduced by means of an outlet pipe 2, when the valve 11 is open, into the still 3. The still 3 is provided with a jacket 4 which has an inlet pipe 5 and an outlet pipe 6, for a heating fluid. It is obvious that the still 3 can be heated in any convenient way in order to maintain the required temperature. The still 3 may also be provided with a stirrer 7, and a thermometer 8.

From the upper portion of the still 3, an outlet pipe 9 for the vapors, fitted with the thermometer 16, passes through the condenser 12, receiver 17 and scrubber 15, to the pump 10, by which the vacuum is maintained. The lower end of the still 3 is provided with a valved outlet pipe 13 for withdrawing the residue into the tank 14 after the distillation has progressed to the desired extent.

In the operation of the apparatus, the sulfonated benzene, which has been previously produced by any suitable sulfonation process, and which still contains the excess sulfuric acid, or the sulfuric acid and water, is led from the tank 1 into the still 3. The still is heated gradually to a temperature which does not exceed about 260° C. and the vacuum pump 10 is operated to maintain an absolute pressure of about $\frac{1}{4}$ to 1 inch of mercury until the distillation has been carried to practical completion or to the desired extent. The temperature and the amount of heating fluid in the jacket 4 are so regulated that the temperature is maintained below 280° C. or below that of decomposition of the particular sulfonic acid or acids present. Most of the sulfuric acid can be distilled off without volatilizing or decomposing any substantial amount of the sulfonic acid. The sulfonic acid which has been freed to a greater or less extent from the sulfuric acid is drawn out through the outlet pipe 13 into the tank 14, where it may be neutralized with a strong solution of soda ash, or sodium sulfite, or sodium carbonate, etc. After this direct neutralization the sodium salt of the sulfonic acid may be drawn off for storage or future use.

Instead of adding to the still 3 a product of sulfonation previously produced, this still, or a similaar still provided with means for maintaining the high degree of vacuum, may be employed for both the sulfonation and the subsequent distillation of the water and sulfuric acid, or the sulfonation process may be practised with the removal of the water formed during the sulfonation, by the maintenance of a sufficient vacuum, and the subsequent distillation of the sulfuric acid may be effected in the same apparatus and by the same vacuum-producing means, merely by increasing the degree of vacuum. When the same apparatus is used for both the sulfonation and the subsequent distillation, the heat still contained in the sulfonation product is made available in the subsequent carrying out of the distillation operation.

From the foregoing description it will be seen that the process of the present invention gives a product which is sufficiently free from excess sulfuric acid so that it can be employed, without the necessity for neutralization with lime, for the production of sulfonic acid salts. Such small amounts of sulfuric acid as still remain can be neutralized by the same operation by which the sulfonic acids themselves are converted into their salts. The process of the present invention accordingly makes possible the direct treatment of the product of sulfonation and distillation for the production of salts of the sulfonic acid produced.

In the specification and claims the term "sulfonic acid" is used to designate a compound of the aromatic series containing one or more $HSO_3$ groups, while the term "di-sulfonic acid" refers to a species of sulfonic acid of the above series in which there are two $HSO_3$ groups. The term "derivatives of" such acids is intended to include a sulfonic acid in which the residue other than the $HSO_3$ group has one or more of its H atoms replaced by other atoms or groups of atoms.

What I claim is:

1. The process of recovering a sulfonic acid which comprises the steps of subjecting a mixture of the sulfonic acid and sulfuric acid to a high vacuum and a temperature below that at which the sulfonic acid decomposes sufficient to distil sulfuric acid therefrom.

2. The process of recovering a sulfonic acid which comprises the steps of subjecting a mixture of the sulfonic acid and sulfuric acid to an absolute pressure of about one inch of mercury and a temperature at which sulfuric acid distils, and below that at which the sulfonic acid decomposes.

3. The process of recovering a sulfonic acid which comprises the steps of subjecting a mixture of the sulfonic acid and sulfuric acid to an absolute pressure of about one inch of mercury and a temperature at which sulfuric acid distils and below that at which the sulfonic acid decomposes until not more than 5% of sulfuric acid remains.

4. The process or recovering a sulfonic acid which comprises the steps of subjecting a mixture of the sulfonic acid and sulfuric acid to a vacuum and a temperature at which sulfuric acid distils and below that at which the sulfonic acid decomposes until not more than 5% of the sulfuric acid remains.

5. The process of recovering a sulfonic acid which comprises the steps of subjecting a mixture of the sulfonic acid, sulfuric acid and water to a sufficient vacuum and temperature so that substantially all the water is removed and then subjecting the residue to such a vacuum and at such a temperature that the sulfonic acid will not be decomposed, until a substantial portion of the sulfuric acid is removed by distillation.

6. The process of producing and recovering a sulfonic acid substantially free from sulfuric acid, which comprises sulfonating a hydrocarbon with an excess of sulfuric acid and before the sulfonation product cools, subjecting it to a high degree of vacuum and at a temperature below which the sulfonic acid decomposes, whereby sulfuric acid is distilled off.

7. The process of recovering benzene di-sulfonic acid which comprises the steps of subjecting a mixture of the di-sulfonic acid and sulfuric acid to an absolute pressure of about one inch of mercury at a temperature of approximately 260° C.

8. The process of removing the excess sulfuric acid which remains after sulfonating benzene which comprises the step of subjecting the mixture to an absolute pressure of about one inch of mercury at a temperature of about 260° C. until less than 5% of sulfuric acid remains.

9. The process of removing the excess sulfuric acid from a mixture of mono- and di-sulfonic acids which comprises the step of subjecting the mixture to a sufficiently high degree of vacuum and temperature to distil off the sulfuric acid.

10. The process of producing and recovering benzene di-sulfonic acid which comprises the steps of subjecting a mixture of the benzene mono- and di-sulfonic acids and sulfuric acid to an absolute pressure of about one inch of mercury at a temperature of approximately 260° C.

11. The process of removing the excess sulfuric acid from a mixture of benzene mono- and di-sulfonic acids which comprises the step of subjecting the mixture to an absolute pressure of less than 1" of mercury at a temperature of approximately 260° C.

12. The method of producing benzene di-sulfonic acid which comprises subjecting benzene to sulfonation, with an excess of sulfuric acid, and at an elevated temperature, and subjecting the product of the sulfonation to an increasing vacuum to remove the water and finally to a high degree of vacuum, and at a temperature of about 260° C. to remove sulfuric acid therefrom.

13. The method of producing benzene di-sulfonic acid which comprises subjecting benzene to sulfonation with an excess of sulfuric acid at an elevated temperature, and subjecting the product of the sulfonation, while still maintained at or near the temperature of sulfonation, to a sufficient degree of vacuum to distil sulfuric acid therefrom.

14. The method of producing and recovering benzene di-sulfonic acid which comprises subjecting benzene to sulfonation with an excess of sulfuric acid, and at a temperature at which sulfonation will be produced, subjecting the sulfonation product prior to the completion of the sulfonation to a sufficient vacuum to remove water formed during the reaction and thereby effect further sulfonation, and subjecting the resulting product while still maintained at a temperature sufficiently high to produce sulfonation, to a sufficient vacuum to remove sulfuric acid therefrom.

In testimony whereof I affix my signature.

CHARLES R. DOWNS.